3,745,184
THERMAL STABILIZATION OF TETRAMETHYLLEAD

Shirl E. Cook and Thomas O. Sistrunk, Baton Rouge, La., assignors to Ethyl Corporation, New York, N.Y.
No Drawing. Continuation-in-part of applications Ser. No. 809,609, Apr. 29, 1959, Ser. No. 41,783, July 11, 1969, Ser. No. 91,598, Feb. 27, 1961, and Ser. No. 104,773, Apr. 24, 1961. This application June 8, 1962, Ser. No. 200,965
Int. Cl. C07f 7/24
U.S. Cl. 260—437 S                39 Claims

ABSTRACT OF THE DISCLOSURE

Tetramethyllead antiknock compositions having markedly enhanced thermal stability by virtue of the utilization therein of particular combinations of highly effective additives.

---

This invention relates to, and has as its chief general object, the provision of tetraalkyllead antiknock compositions having enhanced thermal stability characteristics.

This application is a continuation-in-part of our prior co-pending applications, Ser. No. 809,609, filed Apr. 29, 1959 (now U.S. Pat. 3,049,558, granted Aug. 14, 1962); Ser. No. 41,783, filed July 11, 1960, now abandoned; Ser. No. 91,598, filed Feb. 27, 1961, now abandoned; and Ser. No. 104,773, filed Apr. 24, 1961, now abandoned.

Alkyllead antiknock compounds must be adequately protected against the potential ravages of thermal decomposition especially during their storage and shipment. If this were not done the consequences could be disastrous. Upon reaching sufficiently high temperatures, alkyllead compounds undergo rapid thermal decomposition with the consequent evolution of large quantities of gas. Under many conditions such decomposition occurs with explosive force and violence.

Ethylene dibromide—a known alkyllead thermal stabilizer of very considerable effectiveness; see U.S. Pats. 2,660,591–2,660,596, inclusive—when present with tetramethyllead in a mole ratio as high as 1:1 (70 percent by weight of the dibromide based on the tetramethyllead) does not afford optimum protection against thermal decomposition of the tetramethyllead at elevated temperatures. In fact, tests have shown that such compositions often decompose with considerable explosive force.

An object of this invention is to provide novel tetramethyllead antiknock compositions having markedly enhanced thermal stability characteristics by virtue of the utilization therein of particular combinations of highly effective additives. Other objects of this invention will become apparent from the ensuing description of this invention and the various embodiments thereof.

Tetramethyllead antiknock fluid compositions constitute embodiments of this invention. Thus, when in accordance with one such embodiment, ethylene dibromide is reduced in concentration relative to tetramethyllead such that the mole ratio (ethylene dibromide:tetramethyllead) ranges from about 0.2:1 to about 0.6:1, and there are copresent in the mixture specified quantities of ethylene dichloride and a particular type of hydrocarbon, a very marked enhancement in thermal stability results. The hydrocarbon used pursuant to this embodiment is preferably one or a mixture of alkanes or of mononuclear aromatics containing only aromatic unsaturation, or a mixture of both, where the boiling point is in the range of about 90 to about 150° C.

Thus, provided by this particular embodiment of the invention is a tetramethyllead antiknock composition having enhanced thermal stability characteristics, which composition comprises tetramethyllead, ethylene dibromide, ethylene dichloride and a hydrocarbon having a boiling point in the range of about 90 to about 150° C. selected from the group consisting of alkanes and mono-nuclear aromatics containing only aromatic unsaturation; the ethylene dibromide content being such that there is from about 0.2 to about 0.6 mole thereof per mole of tetramethyllead; the ethylene dichloride content being such that there is from about 0.4 to about 1.2 moles per mole of tetramethyllead; and the content of the hydrocarbon being such that there is from about 10 to about 30 weight percent based on the total weight of the composition. The most outstanding results in these tetramethyllead embodiments are achieved with hydrocarbon concentrations ranging from about 18 to about 30 weight percent and therefore this constitutes a preferred embodiment of this aspect of the invention. Also, ethylene dibromide contents ranging from about 0.3 to about 0.5 mole per mole of tetramethyllead likewise give the very best results and are therefore preferred in these systems.

It will be seen from the foregoing that even though the ethylene dibromide content is very substantially reduced as compared to the potentially explosive 1:1 mole ratio mixture, the above-described tetramethyllead compositions of this invention possess extremely great thermal stability when the specified amounts of ethylene dichloride and above-defined hydrocarbons are used in conjunction with the reduced amount of ethylene dibromide.

Another tetramethyllead embodiment of this invention relates to the discovery that when ethylene dibromide is present with the tetramethyllead in a mole ratio of 1:1. and there are copresent in the mixture specified quantities of the above described alkane or mono-nuclear aromatic hydrocarbon (i.e. one or a mixture of alkanes or of mono-nuclear aromatics containing only aromatic unsaturation, or a mixture of both where the boiling point is in the range of about 90 to about 150° C.), a very marked enhancement in thermal stability results.

Thus provided by this aspect of the invention is a tetramethyllead antiknock composition having enhanced thermal stability characteristics, which composition consists essentially of tetramethyllead, ethylene dibromide and a hydrocarbon having a boiling point in the range of about 90 to about 150° C. selected from the group consisting of alkanes and mono-nuclear aromatics containing only aromatic unsaturation; the ethylene dibromide content being such that there is approximately one mole per mole of tetramethyllead; and the content of the hydrocarbon being such that there is from about 10 to about 30 weight percent thereof based on the total weight of the composition. The most outstanding results from a cost effectiveness standpoint are achieved with hydrocarbon concentrations ranging from about 10 to about 15 weight percent and, therefore, this constitutes a preferred aspect of this embodiment of the invention.

An outstanding aspect of this embodiment not only from the cost effectiveness standpoint but from the standpoint of optimum shipping characteristics is a composition as above defined wherein the hydrocarbon component is present in the mixture in amount such that it is equivalent on a weight basis to about 20 percent of the total weight of tetramethyllead and the hydrocarbon. Putting it another way, in this most preferred aspect of this embodiment there is about 1 part by weight of the hydrocarbon component per each four parts by weight of the tetramethyllead. As pointed out above, there is copresent in this most preferred aspect an amount of ethylene dibromide such that the mole ratio thereof relative to the tetramethyllead is approximately unity.

It has been found that the above described tetramethyllead compositions of this invention possess extremely great thermal stability. In particular, a substantial amount of experimental work has shown conclusively that the compositions of this invention do not begin to thermally decompose until relatively high temperatures are reached. And more than this, these experiments have shown that once this thermal decomposition does set in, the speed of the decomposition reactions is far less than the rate prevailing in the absence of the specified hydrocarbon ingredient. In other words these particular compositions of this invention are harder to thermally decompose than the corresponding antiknock fluid known heretofore and are possessed of the important property of undergoing much slower decomposition reactions once this thermal decomposition commences. The consequences of these findings are vitally important, especially from the standpoint of providing the art with antiknock compositions that are as thermally stable as possible during such operations as formulation, transportation, and storage.

One manifestly important outgrowth of this invention is the fact that the present compositions can be shipped, stored and otherwise handled in equipment with simpler pressure relief mechanisms than would otherwise be required. This benefit is directly attributable to the substantially lower rate of thermal decomposition which the present compositions undergo as compared with the corresponding compositions not containing the hydrocarbon component. As a typical example, compositions of this invention have been shown to develop decomposition pressures at a much slower rate than the corresponding compositions which do not contain the hydrocarbon component. This means that the pressure relief mechanisms can be more effectively and cheaply designed so as to avoid the catastrophic consequences of a violent explosion.

Still another tetramethyllead embodiment of this invention comprises novel tetramethyllead compositions in which tetramethyllead is associated with a specific hydrocarbon complement which confers upon the resultant composition an unusually great resistance against the adverse consequences of thermal decomposition such as might occur upon exposure to heat, fires, or the like. This invention also relates to the unique results provided by these novel compositions.

According to this embodiment of the present invention essentially pure—i.e. highly concentrated—tetramethyllead is stabilized against thermal decomposition, during its recovery from a reaction product mixture, during transportation operations, and during storage by associating with the tetramethyllead from about 20 to about 45 weight percent, based on the total weight of said composition, of a hydrocarbon having a boiling point at atmospheric pressure in the range of from about 90 to about 150° C., said hydrocarbon being selected from the group consisting of alkanes and mono-nuclear aromatics containing only aromatic unsaturation. In short, we provide in accordance with this invention a composition essentially consisting of tetramethyllead and from about 20 to about 45 weight percent, based on the total weight of the composition, of a hydrocarbon of the type just described. This hydrocarbon can be a single material such as toluene, isooctane (i.e. 2,2,4-trimethylpentane) or other similar material described either hereinafter or in our prior copending application Ser. No. 809,609, filed Apr. 29, 1959. However, if desired, equally good results are obtainable by using mixtures of such hydrocarbons so long as they possess the physical and structural characteristics specified above. We especially prefer to use toluene or isooctane (i.e. 2,2,4-trimethylpentane), or a mixture of the two, since these particular materials are plentiful, inexpensive and very effective as thermal stabilizers. Moreover, both of these materials are of considerable value as blending stocks in the finished gasolines for which the tetramethyllead concentrates find their predominant usage.

Another preferred embodiment of this invention is to use hydrocarbons as above defined which are liquids at room temperature and at least a portion of which boils at or above 110° C. Very desirably only minor portions of such preferred hydrocarbons boil below 110° C. Such hydrocarbon liquids are more readily adapted to the processing technique described in our prior copending application referred to above and, at the same time, are ideally suited for accomplishing the specific objects of this embodiment of the invention.

Although it is most desirable to employ from about 20 to about 45 weight percent of the various hydrocarbons described above as thermal stabilizers for the tetramethyllead, it has been found that amounts as low as about 15 percent give good results in many cases (e.g. when using toluene or isooctane). Accordingly, this embodiment of the invention is not intended to be limited to the precise concentration range specified above although it will be understood that marked departures from the foregoing range of the concentrations are undesirable from a number of standpoints including cost effectiveness, ease of processing, and the like. Thus, if the concentration is significantly less than about 15 percent on a weight basis inadequate thermal stability is very likely to be encountered. Conversely if the amount of hydrocarbon liquid is substantially in excess of about 45 percent on a weight basis not only is the cost excessively increased but the resultant concentrate becomes too dilute from a storage and shipment point of view. Therefore, in general, hydrocarbon concentrations ranging from about 20 up to about 45 weight percent are the most suitable for use in accordance with this embodiment of the invention.

A most particularly preferred composition of this embodiment essentially consists of tetramethyllead and toluene in a ratio of approximately 1 part by weight of toluene per each 4 parts by weight of tetramethyllead. This composition ideally accomplishes our objectives, especially when cost and effectiveness factors are taken in consideration.

The compositions of this embodiment are preferably prepared by conducting the process described in our prior copending application referred to above. Thus, in effecting this preferred mode of preparation reference should be had to the disclosure of that application for the operating details. A particular advantage of forming the compositions of this invention by conducting our process technique is that the tetramethyllead so-produced is intimately associated with the thermal stabilizer complement from the time that the tetramethyllead is formed. Accordingly, the tetramethyllead is continuously protected against the potential ravages of thermal decomposition not only during its formation but during all subsequent handling and storage operations involving the resultant compositions.

The compositions of this embodiment may, however, be prepared by mixing the appropriate diluent with tetramethyllead formed by other procedures. In this embodiment it is desirable to admix the appropriate concentrations of the tetramethyllead and of the thermal stabilizers at an early stage in the processing operations so that the time during which the tetramethyllead is in its concentrated state is reduced to a minimum. In effecting this mixing operation use can be made of conventional types of reaction vessels, proportioning pumps, or the like.

Excellent results flow from the unification of the present ingredients in accordance with the principles of this embodiment of the invention. In the first place, the thermal stability of the tetramethyllead is markedly increased as compared with unstabilized, pure tetramethyllead itself. In fact, experiments have shown that the thermal stability of tetramethyllead compositions of this embodiment is frequently 500 times as great as the stability of pure tetramethyllead. Furthermore, the compositions of this embodiment are improved in thermal stability characteristics in at least two respects. For one thing, the rate of decomposition of the present compositions is substantially reduced as compared with the rate of decomposition of unstabilized tetramethyllead. In addition to this, the compositions of this embodiment develop far less decomposition pressure than unstabilized tetramethyllead. Accordingly, the present compositions are characterized by a substantial safety factor so that in the event of accidental exposure to conditions which would normally give rise to catastrophic explosive decomposition, these compositions will undergo decomposition much more slowly and with much less force. The consequences of this from the standpoint of safety of operating personnel are clearly evident.

Another feature of the composition of this aspect of the invention is that the present thermal stabilizers—i.e. the alkanes and mono-nuclear aromatics containing only aromatic unsaturation as described above—are substantially more effective for this purpose than naphthalene and styrene which were among the most effective thermal stabilizers heretofore known for alkyllead antiknock compounds. (See U.S. Pats. 2,660,591 through 2,660,596, inclusive.) This is a singularly unexpected result since by definition the present thermal stabilizers—i.e. the alkanes and the mono-nuclear aromatics containing only aromatic unsaturation having boiling points at atomspheric pressure in the range of from about 90 to about 150° C.—are not fused ring aromatic hydrocarbons nor are they compounds characterized by possessing conventional olefinic unsaturation.

On top of all of this, the compositions of this embodiment are extremely effective antiknock components or additives for modern gasolines. In fact the presence of the inert hydrocarbon liquid provides a highly desirable component of an antiknock liquid, providing a component of high antiknock value in itself and also being itself particularly susceptible to antiknock or octane number improvement.

Inasmuch as there are a number of important embodiments associated with this invention each of these principal embodiments will be further discussed seriatim.

Teteramethyllead-ethylene dibromide-ethylene dichloride-hydrocarbon systems

These systems are tetramethyllead antiknock compositions having enhanced thermal stability characteristics inasmuch as they consist essentially of tetramethyllead, ethylene dibromide, ethylene dichloride and a hydrocarbon having a boiling point in the range of about 90 to about 150° C. selected from the group consisting of alkanes and mono-nuclear aromatics containing only aromatic unsaturation; the ethylene dibromide content being such that there are from about 0.2 to about 0.6 mole thereof per mole of tetramethyllead; the ethylene dichloride content being such that there are from about 0.4 to about 1.2 moles thereof per mole of tetramethyllead; and the content of said hydrocarbon being such that there is from about 10 to about 30 weight percent thereof based on the total weight of the composition.

This embodiment of the invention will be still further understood by reference to the following experimental data. A series of standard thermal decomposition tests was carried out using various tetramethyllead antiknock compositions. The test technique involved placing the specified ingredients in a specially designed autoclave equipped with thermocouple means to measure the temperature of the autoclave contents and with strain gauge means to measure pressure changes. After sealing the appropriate test sample in the autoclave heat was applied at a constant rate until the pressure-temperature records indicated that the tetramehyllead had decomposed or, in the event no pronounced decomposition had occured, until the temperature had reached at least 375° C. Consequently, the higher the temperature at which pronounced thermal decomposition set in the more thermally stable was the composition. Another criterion of the stability characteristics of the composition was whether or not it underwent a violent explosion under the test conditions.

In these tests a pair of runs (Runs 1 and 2) were carried out using antiknock compositions forming no part of this invention. In these runs the ethylene dibromide: tetramethyllead molar ratio was unity, and no ethylene dichloride was present. In Run 1 the sole additive to the tetramethyllead was the ethylene dibromide whereas in Run 2 a small concentration of toluene was copresent. The remaining runs involved use of various compositions of this invention in which the ethylene dibromide:tetramethyllead molar ratio had been dropped to 0.5:1. Additionally these compositions contained ethylene dichloride (the molar ratio relative to tetramethyllead being unity) and a specified amount of typical hydrocarbons as abovedefiined. In Runs 3 and 5 the hydrocarbon was toluene. Isooctane (i.e. 2,2,4-trimethyl pentane) was used as the hydrocarbon in Runs 4, 6 and 7.

The test data are shown in Table I.

TABLE I.—EFFECT OF ADDITIVES ON THERMAL DECOMPOSITION OF TETRAMETHYLLEAD AT ELEVATED TEMPERATURES

| Run | Hydrocarbon content,[1] weight percent | Ethylene dibromide: tetramethyllead, mole ratio | Thermal stability, initiation temp. ° C.[2] | Remarks |
|---|---|---|---|---|
| Compositions not of this invention ||||
| 1 | | 1 | 305 | Violent explosion. |
| 2 | 1.3 | 1 | 295 | Do. |
| Compositions of this invention ||||
| 3 | 13.6 | 0.5 | >375 | Did not explode. |
| 4 | 19.7 | 0.5 | >375 | Do. |
| 5 | 18.2 | 0.5 | >375 | Do. |
| 6 | 15.8 | 0.5 | 340 | |
| 7 | 12.6 | 0.5 | 335 | |

[1] Content based on total weight of composition.
[2] Temperature at which pronounced thermal decomposition commenced.

Other compositions of this embodiment which have greatly enhanced thermal stability are given in the following additional examples in which all percentages are by weight.

EXAMPLE I

Tetramethyllead 51.0 percent, mixed xylenes (commercially available meta-para mixture) 11.0 percent, ethylene dibromide 17.7 percent, ethylene dichloride 18.7 percent, and kerosene 1.6 percent.

EXAMPLE II

Tetramethyllead 52.0 percent, nonane 9.2 percent, ethylene dibromide 18.0 percent, ethylene dichloride 19.1 percent, and kerosene 1.7 percent.

EXAMPLE III

Tetramethyllead 45.7 percent, 4-ethylheptane 19.7 percent, ethylene dibromide 16.1 percent, ethylene dichloride 16.9 percent, and kerosene 1.6 percent.

The nature of the hydrocarbons used in the practice of this embodiment will now be well understood to those skilled in the art. Typical of these compounds are ethylbenzene, toluene, p-xylene, m-xylene, o-xylene, mixed xylene isomers, 2,2,3,3-tetramethylbutane, 2,3-dimethyl pentane, 3-ethyl pentane, 3-ethyl-2-methyl pentane, 3-ethyl-3-methyl pentane, 2,2,4-trimethyl pentane, 2,3-dimethyl hexane, 2,4-dimethyl hexane, 2,5-dimethyl hexane, 3,4-dimethyl hexane, 3-ethyl hexane, 2-methyl hexane, 3-methyl hexane, n-heptane, 4-ethyl heptane, 2-methyl heptane, 3-methyl heptane, 4-methyl heptane, n-octane, 3-methyl octane, n-nonane, and others. Excellent results are achieved not only by the use of the individual compounds but by use of mixtures of the foregoing compounds, especially mixtures which are readily available on a commercial basis at low cost. Mixed xylenes, mixed dimethyl hexanes, mixed methyl heptanes, and various gasoline fractions boiling in or throughout the range of about 90 to 150° C. serve as examples.

In the practice of this embodiment the use of liquid hydrocarbons is preferred since the compositions are more readily formed, remain homogeneous during storage at relatively low temperatures and are more rapidly blended with gasoline. Toluene and isooctane are especially preferred hydrocarbons for use in the practice of this embodiment because of their great effectiveness when so used and because of their great value as blending stocks to finished gasolines made from the instant antiknock compositions.

While this embodiment has been described with particular reference to ethylene dibromide and ethylene dichloride it will be understood that partial or total replacement thereof with an equivalent concentration of propylene dibromide and propylene dichloride provides generally equivalent results.

Tetramethyllead-ethylene dibromide-hydrocarbon systems

In accordance with this embodiment we provide a tetramethyllead antiknock composition having enhanced thermal stability characteristics, which composition consists essentially of tetramethyllead, ethylene dibromide and a hydrocarbon having a boiling point in the range of about 90 to about 150° C. selected from the group consisting of alkanes and mono-nuclear aromatics containing only aromatic unsaturation; the ethylene dibromide content being such that there is about one mole thereof per mole of tetramethyllead; the content of said hydrocarbon being such that there is from about 10 to about 30 weight percent thereof based on the total weight of the composition.

This embodiment will be still further understood by reference to the following experimental data. A series of runs (Runs 1 and 2) were carried out using antiknock compositions forming no part of this invention. In these runs the ethylene dibromide:tetramethyllead molar ratio was unity. In Run 1 the sole additive to the tetramethyllead was the ethylene dibromide whereas in Run 2 a small concentration of toluene was copresent. The remaining runs involved use of various compositions of this invention in which the ethylene dibromide:tetramethyllead molar ratio was unity and there are copresent the specified amount of typical hydrocarbons as above defined. In Runs 3 and 4 the hydrocarbon was toluene. Isooctane (i.e. 2,2,4-trimethylpentane) was used as the hydrocarbon in Run 5. The test data are shown in the following table.

TABLE II.—EFFECT OF ADDITIVES ON THERMAL DECOMPOSITION OF TETRAMETHYLLEAD AT ELEVATED TEMPERATURES

| Run | Hydrocarbon content,[1] weight percent | Thermal stability, initiation temp.,° C.[2] | Maximum rate of pressure increase during decomposition, p.s.i./millisecond |
|---|---|---|---|
| Compositions Not of This Invention | | | |
| 1 |  | 305 | [3] 100 |
| 2 | 1.3 | 295 | [3] 100 |
| Compositions of This Invention | | | |
| 3 | 19.8 | 338 | 10.3 |
| 4 | 12.7 | 328 | 25 |
| 5 | 19.8 | 330 | 12.5 |

[1] Content based on total weight of composition.
[2] Temperature at which pronounced thermal decomposition commenced.
[3] Violent explosion.

The hydrocarbons used in the practice of this embodiment are the same hydrocarbons discussed above with reference to the tetramethyllead-ethylene dibromide-ethylene dichloride-hydrocarbon systems of this invention. As in the previous case, the use of liquid hydrocarbons of the type described is preferred since the compositions are more readily formed, remain homogeneous during storage at relatively low temperatures and are more rapidly blended with gasoline. Toluene and isooctane are especially preferred hydrocarbons for use in the practice of this embodiment because of their great effectiveness when so used and because of their great value as blending stocks to finished gasolines made from the instant antiknock compositions.

As in the case of the tetramethyllead-ethylene dibromide-ethylene dichloride-hydrocarbon systems of this invention, partial or total replacement of the ethylene dibromide with an equivalent concentration of propylene dibromide provides generally equivalent results.

Tetramethyllead-hydrocarbon systems

Apropos this embodiment, we provide an antiknock composition consisting essentially of tetramethyllead and from about 20 to about 45 weight percent, based on the total weight of said composition, of a hydrocarbon having a boiling point at atmospheric pressure in the range of from about 90 to about 150° C., said hydrocarbon being selected from the group consisting of alkanes and mono-nuclear aromatics containing only aromatic unsaturation.

The advantages and benefits of the present embodiment will be readily understood from the examples and further detailed description following. In these particular examples, the compositions of this embodiment are formed in our preferred manner, i.e. by conducting the process described in our prior co-pending application, Ser. No. 809,609, filed Apr. 29, 1959.

EXAMPLE IV

In the following operations an autoclave was employed which was fitted with an internal agitator and a jacket for circulating a heat transfer fluid. In addition, vapor and liquid return lines, to a condenser, provided for condensing and reflux of liquid as desired.

The autoclave was charged with monosodium lead alloy flakes in the proportion of approximately 22 pounds per cubic foot of reaction space. In addition, approximately 5 percent by weight, based upon the alloy, of graphite was introduced as a reaction lubricant, plus approximately 0.2 percent of aluminum, as trimethyl aluminum. Toluene, in the proportion of 10 percent of the alloy weight, was introduced. The reactor and contents were heated to approximately 80° C., and a feed of liquid methyl chloride was then started at a rate of about 10 parts per minute per 100 parts of alloy charge. Reaction occurred promptly, as shown by a further significant rise in operating temperature. The pressure was also allowed to rise to 180 p.s.i.g., and at this time reflux of vapor, principally methyl chloride, was initiated to maintain the pressure at this level. The temperature of the reacting mixture was thus controlled in the range of 95 to about 80° C. by variation of the degree of cooling for refluxing purposes. The methyl chloride feed was continued until a total of approximately 58 parts by weight per 100 parts by weight of alloy charged had been introduced, this corresponding to approximately 160 percent excess of the theoretical requirement. The reaction conditions continued for several hours after termination of the feed, and then the temperature stopped rising and began to drop slightly. The excess pressure was vented shortly thereafter and the autoclave contents cooled to approximately ambient temperature. The charge was then discharged from the autoclave into a pool of water in a steam distillation vessel, and the tetramethyllead and toluene were recovered in high yield.

The example below illustrates a further illustration of a batch process wherein an appreciably larger quantity of material was processed and the excess of methyl chloride was considerably reduced.

EXAMPLE V

In this operation, substantially the same procedure was employed as in Example IV above, except that the sodium lead alloy was charged in the proportions of about 40 pounds per cubic foot of reaction volume. In addition, the reactor was charged with toluene in the proportions of about 10 parts per 100 parts of the alloy, and trimethyl aluminum in proportions providing about 0.2 weight percent aluminum based on the sodium lead alloy. The autoclave and contents were heated to about 90° C., and then methyl chloride feed was initiated. Reaction started almost immediately and the pressure rose rapidly, condensation of vapor and reflux being started by condenser cooling at about 130 pounds per square inch pressure. The bulk of the reaction was conducted at a pressure of about 210 pounds per square inch gauge. The temperature during the feeding and in the reaction zone was readily controlled in this manner, rising in one short period to about 113° C., but the mean temperature was about 100° C. Upon termination of the reaction, the reacted mixture was discharged from the autoclave to a steam distillation operation, and a yield of approximately 70-75 percent of tetramethyllead was obtained, admixed with about 30 weight percent toluene. The operation during the entire reaction period was smooth and readily controlled.

EXAMPLE VI

In this operation the alloy was charged to an autoclave in proportions of 57 pounds per cubic foot of reaction space. In addition, and at the start of the cycle, a mixture of toluene and methyl aluminum sesquichloride catalyst was charged to the reactor, in the proportions of 10 parts of toluene per 100 parts of alloy and methyl aluminum sesquichloride in the proportions of about 0.8 part based on 100 parts of alloy. Further, methyl chloride liquid, in the proportions of 94 pounds per 100 parts of alloy was fed at the very start. This charge corresponded to proportions of about 4.3 times the stoichiometric requirements of the reaction.

The vessel was then heated by circulating hot water at 85° C. through a jacket, while agitating the contents. The temperature was raised to about 70° C. and reaction started smoothly and continued without any difficulty of control, until the reaction was essentially complete. The temperature of the reacting mixture during this period rose from 70 to 100° C., the mean temperature being 85° C. The pressure of operation during the reaction period was maintained at about 205 pounds per square inch gauge.

At the termination of the reaction, the excess pressure was vented and the autoclave charge was cooled by circulating a cooling medium in the jacket. The contents were then discharged and subjected to a steam distillation, and a yield of about 70 percent tetramethyllead was obtained, accompanied by toluene in a concentration of about 35 percent.

The foregoing technique, i.e. introducing the entire charge of methyl chloride upon starting the reaction cycle, is also fully applicable to appreciably lower proportions of the methyl chloride reactant, as shown by the following example.

EXAMPLE VII

The same procedure as employed in Example VI above was used in charging the autoclave, except that the methyl chloride was introduced in the proportions of 30.6 parts of methyl chloride per 100 parts of the monosodium lead alloy. This proportion corresponds to 1.26 stoichiometric requirements, plus sufficient methyl chloride to occupy as vapor the vapor space of the autoclave and associated vapor condensing equipment. After charging, the autoclave and contents were heated by circulating hot water through the jacket and the temperature was raised to about 66° C. at which time cooling of the reflux condenser was initiated. The pressure was controlled, by refluxing of liquefied vapors, at about 170 p.s.i.g. Reaction occurred very smoothly and the temperature continued to rise at a reasonable rate up to as high at 118° C., the mean temperature being at or slightly above 90° C. After several hours reaction with easy control, the autoclave and contents were cooled and excess pressure was vented. The reacted charged was discharged and steam distilled. A high yield, of the order of about 65 percent tetramethyllead, accompanied by about 35 weight percent of toluene was recovered.

The applicability of these methods to continuous operations is illustrated by the example below.

EXAMPLE VIII

In this operation, the reaction zone is a vertical autoclave having a hemispherical bottom and a vertically mounted agitator projecting into the reaction zone and capable of being rotated at a high rate of speed to provide vigorous agitation. During continuous operation, feed materials were fed to this reaction zone in the following proportions:

| | |
|---|---|
| Monosodium lead alloy | 100 |
| Methyl chloride | 200 |
| Toluene | 20 |
| Aluminum chloride | 0.2 (Al) |

The reacting materials within the reaction zone were vigorously agitated, but at a power input level such that there was a distribution of unreacted alloy concentrated at the bottom of the zone, with reacted solids tending to concentrate at the top of the zone. By reacted solids is meant sodium chloride by-product of the reaction and unreacted lead. From an upper portion of the zone a product stream was withdrawn having the following compositions:

| | |
|---|---|
| Tetramethyllead | 7.5 |
| Methyl chloride | 57 |
| Toluene | 6 |
| Sodium chloride | 8 |
| Lead | 21 |

This product stream corresponds to a yield of approximately 75-80 percent of the alloy feed. The solids are separated by filtration or similar operations, and the methyl chloride component is vaporized off leaving a tetramethyllead product containing approximately 45 percent toluene.

In this operation the alloy feed can be provided in the form of sub-divided, highly reactive flakes. Alternatively the alloy can be introduced as a molten liquid. The toluene can be blended with the methyl chloride feed externally of the reactor, or alternatively can be introduced as a separate liquid stream. The reaction zone is maintained at a temperature of about 85 to 90° C. and under autogenous pressure.

From the foregoing examples it will be clear that the method of forming the compositions of this invention is susceptible to a significant variety of operating techniques. For example, the proportion of inert hydrocarbon liquid, or the specific identity, can be appreciably varied.

EXAMPLE IX

When Examples IV through VI are repeated, except that the toluene is introduced in the proportions of about 20 percent, based on the alloy, similar results are achieved, except that the average temperature of operation is slightly higher.

When the conditions of operation of Example VII are used, the toluene or other inert hydrocarbon should not be used in proportions significantly above 11 or 12 weight percent of the alloy, in order to be below the preferred upper limit of 50 volume percent of the methyl chloride provided.

In addition to operation at higher concentrations of inert hydrocarbon, as exemplified above, perfectly satisfactory results are achieved when the hydrocarbon is substantially reduced in concentration, as illustrated by the following example.

EXAMPLE X

Generally, the same procedure as described in Example IV was followed, the loading of the reaction zone or autoclave being about 37 pounds of alloy per cubic foot. Instead of providing toluene in the proportions of about 10 parts to 100 parts of alloy, however, the concentration was lowered to about only 7 parts per hundred parts of alloy. The catalyst employed was in the proportions of .44 part of trimethyl aluminum per 100 parts of alloy. Upon raising the temperature by external heating, and feeding methyl chloride in the proportions of about 1.6 times theoretical requirements, very efficient operation was obtained, the pressure being stabilized at 180 pounds per square inch gauge, and the temperature rising and being controlled at a maximum level of about 110° C., and a minimum temperature of about 85-90° C. After reaction, the reacted mixture was discharged and steam distilled and a high yield of 70 percent tetramethyllead was achieved, accompanied by the toluene employed.

If desired, the inert hydrocarbon concentration can be even slightly lower than in this example, proportions of as low as about 5 parts per 100 parts of lead being quite operable. However, the best results are usually provided when a concentration of at least 10 pounds per 100 pounds of lead is used.

EXAMPLE XI

When Examples IV through VII are repeated, except that, instead of toluene, either 10 or 20 percent of 2,2,4-trimethylpentane (isooctane) is substituted for the toluene, similar results are achieved, except that the temperature of operation at comparable pressures are slightly lower than in the case of the foregoing example using toluene. In addition, when a low excess of methyl chloride is used, as in Example VII, the upper limit of the amount of isooctane should be reduced, desirably, to not over about ½ the liquid volume of the methyl chloride reactant.

Instead of pure hydrocarbon compositions, mixtures or blends can be employed, and in some cases are preferred, as shown by the following example.

EXAMPLE XII

The procedure of Examples IV through VII is repeated in operations wherein, instead of toluene, an aromatic type solvent is employed having an initial boiling point of about 100° C. and a final boiling point of about 130° C. Similar yields and ease of operation are attained, and the tetramethyllead is accompanied, during steam distillation recovery, by a satisfactory concentration of the solvent components. Similar results are achieved in the foregoing operations. It is also observed that a more uniform distribution of inert liquid is observed, accompanying the tetramethyllead product, during the steam distillation, than is obtained when using a pure isooctane diluent material.

EXAMPLE XIII

The procedure followed in Example VI is followed, generally, except that an alloy containing 20 weight percent sodium is used. The charge to the reactor consists of

| | Parts |
|---|---|
| Alloy | 100 |
| Methyl chloride | 63 |
| Toluene | 15 |
| Trimethyl aluminum | 2 |

The quantity of methyl chloride used amounts to 1.4 theories, plus a slight excess to occupy the free space in the reaction system. After charging these reactants, the autoclave and contents are heated to suitable temperatures to begin reaction, and the bulk of the reaction is carried out at approximately 100° C. and a pressure of about 190 pounds. After completion of the reaction, the reacted mixture is discharged and the tetramethyllead is steam distilled, a high yield being accompanied by about 25 percent toluene.

One of the particular beneficial effects of the present invention is the fact that a highly stable reaction and product system is achieved and maintained. It is found that the inert materials employed in limited quantity in the above process are highly effective in inhibiting the decomposition of tetramethyllead. The following data illustrate clearly the magnitude of this benefit. A series of operations were conducted in which specimens of pure tetramethyllead, or tetramethyllead with defined quantities of inert liquids were subjected to a procedure designed to cause decomposition, and allow measurement of the rapidity and/or severity of the decomposition. This procedure involved inserting the specimen in a closed steel vessel having a wire passing through the interior and through the specimen proper. The wire was then heated by passing electrical current therethrough. The temperature of the specimen was also measured. Recording pressure devices, in some cases of the oscilloscope type, were employed to provide a clear and accurate record of the time-pressure history. In a series of operations of this character, the following results were obtained:

| Specimen | Initiation temperature | Maximum temp. | Maximum pressure | Decomposition time, sec. |
|---|---|---|---|---|
| Pure TML | 105 | 265 | 1,030 | ca. 0.1 |
| TML plus 25 wt. percent toluene | 105 | 165 | 100 | 50 |
| TML plus 20 wt. percent toluene | 105 | 140 | 80 | 17.5 |

The foregoing shows the effect of the presence of toluene on improving the stability of tetramethyllead. It is seen that an increase in stability of from 175 to 500, at least, in improvement is realized. Similar benefits were demonstrated when the decomposition of specimens was initiated by ignition caused by a thermite reaction. In these operations, a similar procedure was used, except that the electric wire was used to initiate a thermite reaction. The thermite reaction (iron oxide plus aluminum) provides a temperature of over 2000° C., so this technique provides a very drastic test. In these experiments the effectiveness of typical thermal stabilizers of this invention was directly compared with the effectivenss of styrene and of naphthalene, two of the most effective alkyllead thermal stabilizers heretofore known. Thus, in Run A below the composition of this invention contained approximately 39 percent by weight of toluene and in Run B it contained approximately 26 percent by weight of isooctane. For comparative purposes the tetramethyllead used in Runs C and D contained approximately 31 percent by weight of styrene and approximately 26 percent by weight of naphthalene, respectively. The results of these operations were as follows:

| Run | Specimen | Initiation temp. | Maximum temp. | Maximum pressure | Decomposition time, sec. |
|---|---|---|---|---|---|
| Compositions of This Invention ||||||
| A | 40 g. TML plus 30 ml. toluene | 100 | 230 | 360 | 7.5 |
| B | 40 g. TML plus 20 ml. isooctane | 105 | 125 | 410 | 25 |
| Compositions Not of This Invention ||||||
| C | 40 g. TML plus 20 ml. styrene | 105 | 335 | 1,275 | 3 |
| D | 40 g. TML plus 25.9 wt. percent naphthalene | 105 | | >2,000 | <0.5 |

From the above, it is seen that the presence of the hydrocarbon solvents results in improvement in the stability of from 70 to 250 times the stability of tetramethyllead alone. Moreover, the thermal stability of the compositions of this invention were found to be over 200 percent as great as the thermal stability of a corresponding composition which contained styrene as the thermal stabilizer. In particular the decomposition time in Runs A and B were substantially longer than the decomposition time in Run C. Furthermore, the maximum pressure produced in Runs A and B were far less than that developed in Run C.

By the same token these test results show conclusively that the compositions of this invention were vastly superior from the thermal stability standpoint as compared to the composition composed of tetramethyllead and naphthalene used in Run D. In fact the compositions of this invention had decomposition times that were at least 15 times as long as the decomposition time of the naphthalene-containing composition. Moreover, the maximum pressure developed was far less with the compositions of this invention than it was in the case of the naphthalene-containing composition.

Similar results are achieved when, instead of determining the rate of decomposition of a tetramethyllead product which has been separated from the other components of the reaction, a determination is made of the reacted mixture (reaction mass) prior to separation. Tests have shown that the rate of decomposition is reduced by a factor of at least about 4 and usually over 6. Hence, the present invention provides a high degree of effectiveness during the reaction as well as during subsequent separation and after segregation of the tetramethyllead product.

The foregoing shows the great degree of improvement in stability even when the specimen is subject to the severe shock of a thermite type reaction. A highly significant benefit in the present operation is that it assures that the inert liquid is in the presence of the tetramethyllead from the moment it is synthesized and remains with, or accompanies the product, during recovery operations. The most effective recovery operations involve a partial pressure operation to isolate a tetramethyllead product fraction. Hence, it is of importance that the volatility of the inert liquid be in the neighborhood or approaching the volatility of tetramethyllead, at least with respect to some components thereof. Toluene, having a boiling point of 110.6° C. is ideal in this respect. However, commercial hydrocarbon streams, having a boiling range which overlaps the normal boiling point of tetramethyllead, are quite acceptable. These may be paraffinic or aromatic in character provided they possess the physical and chemical characteristics described above.

Other thermal stabilizers which are highly satisfactory in the present embodiment have been described above with reference to the tetramethyllead-ethylene dibromide-ethylene dichloride-hydrocarbon and tetramethyllead-ethylene dibromide-hydrocarbon systems of this invention.

As stated above, the compositions of this embodiment consist essentially of the tetramethyllead and the thermal stabilizer complement in the proportions herein specified. An outstanding example of such a composition is one in which there is 80.57 weight percent of tetramethyllead and 19.43 weight percent of toluene, the density of this particularly preferred composition being 1.5842 g./ml. at 20° C. However, the compositions of this invention may also contain certain other ingredients, notably dyes for identification purposes, blending aids such as kerosene, and antioxidants such as 2,6-di-tert-butyl phenol, 2,4,6-tri-tert-butyl phenol, 4-methyl-2,6-di-tert-butyl phenol, and the like. It will be noted that the compositions of the present embodiment are halogen-scavenger free.

From the foregoing description and examples it is seen that the present invention is susceptible of numerous variations and adjustments, subject only to the limitations of the claims below.

What is claimed is:

1. A concentrated tetramethyllead antiknock fluid composition having enhanced thermal stability characteristics, which composition consists essentially of tetramethyllead, ethylene dibromide, ethylene dichloride and a hydrocarbon having a boiling point in the range of about 90 to about 150° C. selected from the group consisting of alkanes and mono-nuclear aromatics containing only aromatic unsaturation; the ethylene dibromide content being such that there are from about 0.2 to about 0.6 mole per mole of tetramethyllead; the ethylene dichloride content being such that there are from about 0.4 to about 1.2 moles per mole of tetramethyllead; and the content of said hydrocarbon being such that there is from about 10 to about 30 weight percent thereof based on the total weight of the antiknock fluid composition.

2. The composition of claim 1 wherein the content of said hydrocarbon ranges from about 18 to about 30 weight percent based on the total weight of the composition.

3. The composition of claim 1 wherein said hydrocarbon is a liquid hydrocarbon.

4. The composition of claim 1 wherein said hydrocarbon is toluene.

5. The composition of claim 1 wherein said hydrocarbon is 2,2,4-trimethyl pentane.

6. A concentrated tetramethyllead antiknock fluid composition having enhanced thermal stability characteristics, which composition consists essentially of tetramethyllead, ethylene dibromide and a hydrocarbon having a boiling point in the range of about 90 to about 150° C. selected from the group consisting of alkanes and mono-nuclear aromatics containing only aromatic unsaturation; the ethylene dibromide content being such that there is about one mole per mole of tetramethyllead; the content of said hydrocarbon being such that there is from about 10 to about 15 weight percent thereof based on the total weight of the antiknock fluid composition.

7. The composition of claim 6 wherein said hydrocarbon is a liquid hydrocarbon.

8. The composition of claim 6 wherein said hydrocarbon is toluene.

9. A concentrated tetramethyllead antiknock fluid composition having enhanced thermal stability characteristics, which composition consists essentially of tetramethyllead, ethylene dibromide, and toluene, the ethylene dibromide content being such that there is about one mole thereof per mole of tetramethyllead; the toluene content being such that there is about one part by weight thereof per each four parts by weight of the tetramethyllead.

10. A halogen scavenger-free concentrated antiknock fluid composition consisting essentially of tetramethyllead and from about 20 to about 45 weight percent, based on the total weight of said composition, of a hydrocarbon having a boiling point at atmospheric pressure in the range of from about 90 to about 150° C., said hydrocarbon being selected from the group consisting of alkanes and mono-nuclear aromatics containing only aromatic unsaturation.

11. The composition of claim 10 wherein said hydrocarbon includes toluene.

12. The composition of claim 10 wherein said hydrocarbon includes 2,2,4-trimethyl pentane.

13. An antiknock composition essentially consisting of tetramethyllead and toluene in a ratio of approximately one part by weight of toluene per each four parts by weight of tetramethyllead.

14. The composition of claim 10 wherein said hydrocarbon is an alkane hydrocarbon.

15. The composition of claim 10 wherein said hydrocarbon is a mono-nuclear aromatic hydrocarbon containing only aromatic unsaturation.

16. A concentrated tetramethyllead composition possessing enhanced resistance against thermal decomposition, which composition essentially consists of tetramethyllead and from about 20 to about 45 weight percent, based on total weight of said composition, of at least one hydrocarbon having a boiling point at atmospheric pressure in the range of from about 110° to about 150° C., said hydrocarbon being selected from the group consisting of alkanes and mono-nuclear aromatics containing only aromatic unsaturation.

17. The composition of claim 16 wherein said hydrocarbon is an alkane hydrocarbon.

18. The composition of claim 16 wherein said hydrocarbon is a mono-nuclear aromatic hydrocarbon containing only aromatic unsaturation.

19. A concentrated tetramethyllead antiknock composition susceptible to rapid decomposition due to thermal decomposition of the tetramethyllead at elevated temperatures consisting essentially of tetramethyllead and a hydrocarbon having a boiling point in the range of about 90 to about 150° selected from the group consisting of alkanes and mono-nuclear aromatics containing only aromatic unsaturation, said hydrocarbon being present in an amount of at least about 15 weight percent and not substantially in excess of about 45 weight percent based on the total weight of the antiknock composition sufficient to inhibit such thermal decomposition of the tetramethyllead.

20. A composition according to claim 19 wherein the hydrocarbon content is no higher than about 30 weight percent based on the total weight of the antiknock composition.

21. A composition according to claim 19 wherein said hydrocarbon is a liquid hydrocarbon.

22. A composition according to claim 19 wherein said hydrocarbon is a mono-nuclear aromatic hydrocarbon containing only aromatic unsaturation.

23. A composition according to claim 19 wherein said hydrocarbon is toluene.

24. A composition according to claim 19 wherein said hydrocarbon is an alkane.

25. A composition according to claim 19 wherein said hydrocarbon is 2,2,4-trimethyl pentane.

26. In a tetramethyllead antiknock fluid composition containing tetramethyllead and ethylene dibromide, the improvement according to which the composition also contains ethylene dichloride and a hydrocarbon having a boiling point in the range of about 90 to about 150° C. selected from the group consisting of alkanes and mono-nuclear aromatic hydrocarbons containing only aromatic unsaturation and the proportions are such that there are about 0.5 mole of ethylene dibromide per mole of tetramethyllead, about 1.0 mole of ethylene dichloride per mole of tetramethyllead and from about 10 to about 30 weight percent of said hydrocarbon based on the total weight of said composition so that the temperature at which pronounced thermal decomposition of said composition commences as the temperature thereof is elevated while the composition is under confinement, is at least about 335° C.

27. A composition according to claim 26 wherein said hydrocarbon is a liquid hydrocarbon whereby said composition is further improved in that it remains homogeneous during storage at relatively low temperatures.

28. A composition according to claim 26 wherein said hydrocarbon is a mono-nuclear aromatic hydrocarbon containing only aromatic unsaturation.

29. A composition according to claim 26 wherein said hydrocarbon is toluene.

30. A composition according to claim 26 wherein said hydrocarbon is an alkane.

31. A composition according to claim 26 wherein said hydrocarbon is 2,2,4-trimethyl pentane.

32. In a tetramethyllead antiknock fluid composition containing tetramethyllead and ethylene dibromide, the improvement according to which the composition also contains ethylene dichloride and a hydrocarbon having a boiling point in the range of about 90 to about 150° C. selected from the group consisting of alkanes and mono-nuclear aromatic hydrocarbons containing only aromatic unsaturation and the proportions are such that there are about 0.5 mole of ethylene dibromide per mole of tetramethyllead, about 1.0 mole of ethylene dichloride per mole of tetramethyllead and about 12.6 weight percent of said hydrocarbon based on the total weight of said composition so that the temperature at which pronounced thermal decomposition of said composition commences as the temperature thereof is elevated while the composition is under confinement, is about 335° C.

33. A composition according to claim 32 wherein said hydrocarbon is a liquid hydrocarbon whereby said composition is further improved in that it remains homogeneous during storage at relatively low temperatures.

34. A composition according to claim 33 wherein said hydrocarbon is a mono-nuclear aromatic hydrocarbon containing only aromatic unsaturation.

35. A composition according to claim 34 wherein said hydrocarbon is toluene.

36. A composition according to claim 35 wherein said hydrocarbon is an alkane.

37. A composition according to claim 36 wherein said hydrocarbon is 2,2,4-trimethyl pentane.

38. A concentrated tetramethyllead antiknock fluid composition having enhanced thermal stability characteristics, which composition consists essentially of tetramethyllead, ethylene dibromide and 2,2,4-trimethyl pentane; the ethylene dibromide content being such that there is about one mole per mole of tetramethyllead; the content of said 2,2,4-trimethyl pentane being such that there is from about 10 to about 30 weight percent thereof based on the total weight of the anti-knock fluid composition.

39. A concentrated tetramethyllead antiknock fluid composition having enhanced thermal stability characteristics, which composition consists essentially of tetramethyllead, ethylene dibromide and a hydrocarbon having a boiling point in the range of about 90 to about 150° C. selected from the group consisting of alkanes and mono-nuclear aromatics containing only aromatic unsaturation; the ethylene dibromide content being such that there is about one mole per mole of tetramethyllead; the content of said hydrocarbon being such that there is approximately one part by weight thereof per each four parts by weight of the tetramethyllead.

References Cited

UNITED STATES PATENTS

| | | | |
|---|---|---|---|
| 1,815,753 | 7/1931 | Wilson | 44—69.1 |
| 2,660,595 | 11/1953 | Calingaert | 260—437 |
| 2,836,568 | 5/1958 | Ecke et al. | 260—437 |
| 2,860,958 | 11/1958 | Gilbert | 252—386 |

FOREIGN PATENTS

| | | | |
|---|---|---|---|
| 670,526 | 4/1952 | Great Britain | 260—437 S |
| 718,567 | 11/1954 | Great Britain | 44—69 |

HELEN M. S. SNEED, Primary Examiner

U.S. Cl. X.R.

44—69; 252—386